United States Patent [19]

Shiratsuchi

[11] Patent Number: 4,796,719
[45] Date of Patent: Jan. 10, 1989

[54] MOTORCYCLE WITH FAVORABLE AIR CLEANER LAYOUT

[75] Inventor: Koji Shiratsuchi, Wako, Japan

[73] Assignee: Honda Giken Kogyo Kabushiki Kaisha, Tokyo, Japan

[21] Appl. No.: 85,765

[22] Filed: Aug. 17, 1987

[30] Foreign Application Priority Data

Aug. 21, 1986 [JP] Japan .................. 61-195781

[51] Int. Cl.⁴ .............................................. B62D 61/02
[52] U.S. Cl. ..................... 180/219; 280/5 A; 55/385.3
[58] Field of Search ............ 180/219, 225, 215; 280/5 A; 55/385 B

[56] References Cited

U.S. PATENT DOCUMENTS 4,475,617 10/1984 Minami et al. ................. 180/219
4,509,613 4/1985 Yamaguchi ..................... 180/219

FOREIGN PATENT DOCUMENTS 59-30790 2/1984 Japan .

*Primary Examiner*—David M. Mitchell
*Assistant Examiner*—Donn McGiehan
*Attorney, Agent, or Firm*—Nixon & Vanderhye

[57] ABSTRACT

A motorcycle, comprising a power unit including an engine having a substantially vertically disposed cylinder and a transmission extending rearwardly from a lower part of the engine; a fuel tank arranged above the power unit; and a seat arranged behind the fuel tank; further comprising: an air cleaner unit accommodated in a space defined by a rear surface of the engine and an upper surface of the transmission; an upper part of the air cleaner unit protruding into a concave bottom surface of a rear part of the fuel tank while an outlet port of the air cleaner unit is connected to an intake port of the engine by way of a passage which is slanted downwards as it extends to the intake port of the engine. Thus, the internal volume of the air cleaner case can be increased without affecting the position of the set, the wheel base, or the width of the part of the motorcycle body which is to gripped between the knees of the rider.

18 Claims, 1 Drawing Sheet

MOTORCYCLE WITH FAVORABLE AIR CLEANER LAYOUT

TECHNICAL FIELD

The present invention relates to a motorcycle and in particular to a motorcycle having a favorable air cleaner layout which permits a relatively large air cleaner to be fitted into a motorcycle body.

BACKGROUND OF THE INVENTION

The air cleaner of a motorcycle is typically placed in a space generally located under the rear end of a fuel tank and a seat as disclosed in Japanese Utility Model Laid Out Publication No. 59-30790 and Japanese Patent Laid Out Publication No. 60-185685.

The casing of an air cleaner is required to have a certain large volume not only for giving a sufficient surface area to the filter element which is to be installed in the casing but also, in the case of a multi-cylinder engine, for attenuating intake air noise by preventing the interference between the pulsating flows of intake air of different engine cylinders.

However, when one attempts to increased the volume of the casing of an air cleaner by extending it upward or sideways, the height of the seat has to be increased or the rider will experience a difficulty in gripping the motorcycle body between his knees as the case may be, causing considerable discomfort to the rider in either case. If the casing of the air cleaner is extended rearward, the wheel base of the motorcycle must be increased for accommodating the engine intake system, and the maneuverability of the motorcycle will be impaired.

BRIEF SUMMARY OF THE PRESENT INVENTION

In view such problems of the prior art, a primary object of the present invention is to provide a motorcycle equipped with an air cleaner having a sufficient internal volume without impairing the handling and the maneuverability of the motorcycle.

According to the present invention, this and other objects of the present invention will be accomplished by providing a motorcycle comprising a power unit including an engine having a substantially vertically disposed cylinder and a transmission extending rearwardly from a lower part of the engine; a fuel tank arranged above the power unit; and a seat arranged behind the fuel tank; further comprising: an air cleaner unit accommodated in a space defined by a rear surface of the engine and an upper surface of the transmission; an upper part of the air cleaner unit protruding into a concave bottom surface of a rear part of the fuel tank while an outlet port of the air cleaner unit is connected to an intake port of the engine by way of a passage which is slanted downwards as it extends to the intake port of the engine.

Thus, the internal volume of the air cleaner case can be increased without affecting the position of the seat, the wheel base, or the width of the part of the motorcycle body which is to be gripped between the knees of the rider.

According to a certain aspect of the present invention, the casing of the air cleaner unit is substantially prismoid with an upward taper in shape defining an air flow passage extending substantially along a longitudinal axial line thereof. Preferably, the longitudinal axial line of the casing is slightly inclined in forward direction. Thus, the available space can be efficiently utilized to the maximum extent.

According to another aspect of the present invention, the engine is provided with a plurality of laterally arranged cylinders, and a plurality of outlet ports of the air cleaner casing are connected to corresponding intake ports of the engine with individual conduits which diverge as they extend toward the engine.

According to yet another aspect of the present invention, the filter element is generally planar and is placed in a lower part of the casing perpendicular to the longitudinal axial line of the casing. Preferably, the casing is provided with an externally projecting bulge for accommodating the air filter element therein.

DETAILED DESCRIPTION OF THE PREFERRED EMBODIMENT

Figure 1:
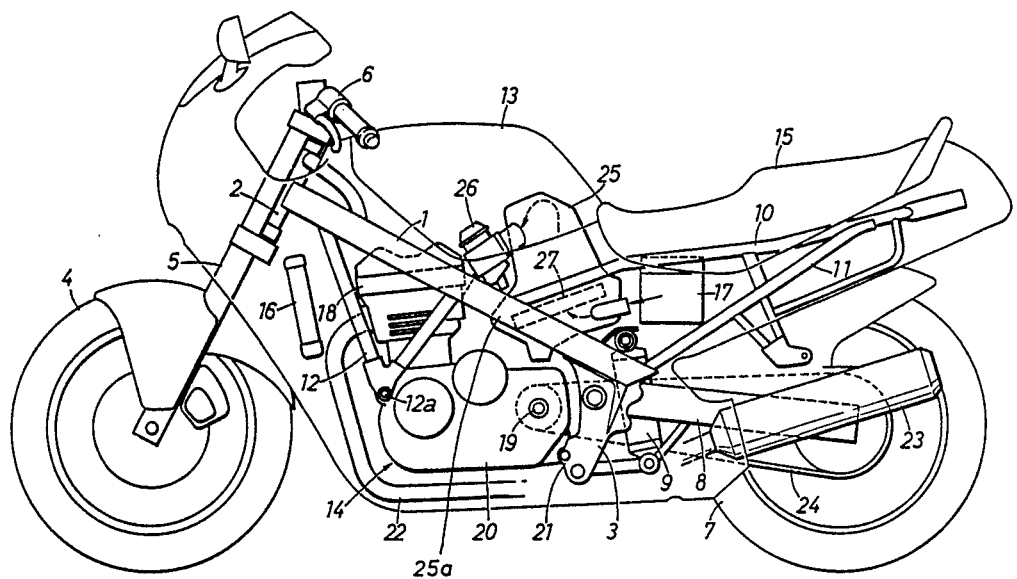
FIG. 1 is a side view of an embodiment of the motorcycle according to the present invention.

Now an embodiment of the present invention is described in the following with reference to the appended drawings:

FIG. 1 generally shows an embodiment of the motorcycle according to the present invention. A main frame of this motorcycle consists of a pair of main frame pipes 1, a head pipe 2 to which the front ends of the main frame pipes 1 are fixedly joined together, and a pair of rear fork hangers 3 fixedly attached to rear ends of the corresponding main frame pipes 1.

The head pipe 2 rotatably supports a front fork 5 which in turn carries the front wheel 4 of this motorcycle at its lower end in a freely rotatable manner, and by turning a handle bar 6 which is fixedly attached to the top end of the front fork 5 one can steer the front wheel 4. The rear fork hangers 3 pivotally support the bifurcated front ends of a rear fork 8 which carries the rear wheel 7 of this motorcycle at its rear end by way of a suspension system 9 consisting of a hydraulic damper and a compression coil spring.

A pair of seat rails 10 extend from the top surfaces of middle parts of the main frame pipes 1, respectively, and the rear ends of these seat rails 10 are supported by a pair of seat stays 11 extending rearward and upward from the rear ends of the main frame pipes 1. Further, a pair of down tubes 12 depend from the lower surfaces of front parts of the main frame pipes 1.

A fuel tank 13 is placed over a middle part of the main frame pipes 1 and a power unit 14 is fitted generally under the main frame pipes 1. A seat 15 is attached to the top surfaces of the seat rails 10 immediately behind the fuel tank 13. A radiator 16 for cooling engine cooling water is disposed in front of the down tubes 12 and a battery 17 is placed right under the seat 15.

The power unit 14 comprises an engine 18 having four cylinders arranged laterally in line, and a transmission 20 which is connected to a rear side of a lower part of the cylinder block of the engine 18 so as to define the shape of letter L in cooperation with the engine itself and is provided with a laterally extending output shaft 19, and this power unit 14 is supported by the lower ends 12a of the down tubes 12 extending downward from the main frame pipes 1 and transmission mounts 21 provided in the rear fork hangers 3.

A pair of exhaust pipes 22 extend from a front surface of the engine to the rear end of the motorcycle and emit exhaust gas to the rear of the motorcycle each by way of a muffler 23 provided in each tail end of the exhaust pipes adjacent the rear wheel 7. A chain 24 is passed around sprocket wheels which are attached to the output shaft 19 of the power transmission 20 and the axle of the rear wheel 7 for transmitting power from the power transmission 20 to the rear wheel 7.

An air cleaner case 25 is disposed in a gap which is defined between the rear surface of the engine 18 and the upper surface of the transmission 20 in the shape of letter "L".

Figure 2:
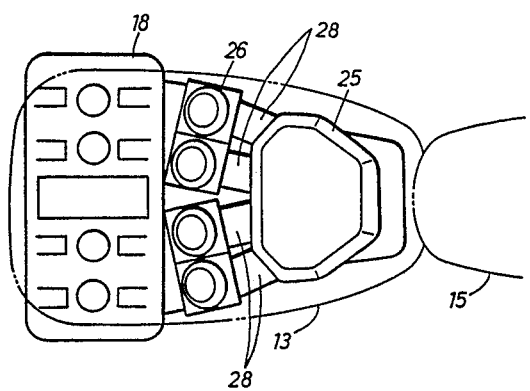
FIG. 2 is a schematic plan view of a part of the motorcycle.

The bottom of the rear part of the fuel tank 13 is concave as seen from outside defining a hollow space thereat. The air cleaner case 25 is generally in the shape of a frustum of pyramid or, in other words, prismoid in shape and its rounded top portion projects into the hollow space defined under the bottom of the rear part of the fuel tank 13. As best shown in FIG. 2, four conduits 28 extend from the front surface of the air cleaner casing 25 to the corresponding inlet ports of the engine cylinders. These conduits 28 are slanted downward as they extend towards the engine as seen from sideways as shown in FIG. 1 and diverges slightly as they extend towards the engine 18 as seen from top as shown in FIG. 2. Each of these conduits 28 is provided with an individual carburetor 26. Further, the casing 25 is tapered towards the rear as seen in plan view for presenting a contour which is suitable to be gripped between the knees of the rider.

The front part of a lower part of the air cleaner casing 25 is provided with a bulge 25a which extends into the space defined by the lower surfaces of the carburetor 26, the rear surface of the engine 18 and the upper surface of the transmission 20. By taking advantage of this bulge 25a, a relatively large air filter element 27 is fitted into the air cleaner casing 25. This filter element 27 is generally flat and is slightly slanted forwardly from a horizontal plane so as to be perpendicular to the axial line of the air cleaner casing 25. The intake air is introduce into the air cleaner casing 25 from a lower most part of the rear end of the casing 25 and, inside the casing 25, flows upward along the axial line of the casing 25 across the air filter element 27 before it is distributed to the conduits 28 carrying the carburetors 26 from an upper most part of the front end of the casing 25, as indicated by a dotted line in FIG. 1.

Thus, the internal volume of the air cleaner casing can be increased without affecting the position of the seat, the wheel base, or the width of the part of the motorcyle body which is to be gripped between the knees of the rider. Furthermore, since the passage for the intake air is made relatively straight, the intake efficiency of the engine can be improved. Also, since the conduits are inclined downward towards the engine, the carburetors provided on the conduits are also inclined and can be accommodated in the given space without interfering with adjacent parts such as a fuel tank.

Although the present invention has been shown and described with reference to the preferred embodiment thereof, it should not be considered as limited thereby. Various possible modifications and alterations could be conceived of by one skilled in the art to any particular embodiment, without departing from the scope of the invention.

What I claim is:

1. A motorcycle, comprising a power unit including an engine having a substantially vertically disposed cylinder and a transmission extending rearwardly from a lower part of the engine; a fuel tank arranged above the power unit; and a seat arranged behind the fuel tank; further comprising:
   an air cleaner unit accommodated in a space defined by a rear surface of the engine and an upper surface of the transmission;
   an upper part of the air cleaner unit protruding into a concave bottom surface of a rear part of the fuel tank;
   the air cleaner unit comprising a casing, an air inlet provided in a lower part of the air cleaner casing, a vertical and upward flow passage, an air outlet which extends from an upper part of the air cleaner casing and is connected to an intake port of the engine by way of a passage which is slanted downwards as it extends to the intake port of the engine.

2. A motorcycle as defined in claim 1, wherein a casing of the air cleaner unit is substantially prismoid with an upward taper in shape defining an air flow passage extending substantially along a longitudinal axial line thereof.

3. A motorcycle as defined in claim 2, wherein the longitudinal axial line of the casing is slightly inclined in forward direction.

4. A motorcycle as defined in claim 3, wherein the engine is provided with a plurality of laterally arranged cylinders and a plurality of outlet ports of the air cleaner casing are connected to corresponding intake ports of the engine with individual conduits which diverge as they extend toward the engine.

5. A motorcycle as defined in claim 1, wherein an air filter element is generally planar and is placed in a lower part of the casing perpendicular to the longitudinal axial line of the casing.

6. A motorcycle as defined in claim 5, wherein the casing is provided with an externally projecting bulge for accommodating the air filter elements therein.

7. A motorcycle, comprising a power unit including an engine having a substantially vertically disposed cylinder and a transmission extending rearwardly from a lower part of the engine; a fuel tank arranged above the power unit; and a seat arranged behind the fuel tank; further comprising:
   an air cleaner unit accommodated in a space defined by a rear surface of the engine and an upper surface of the transmission;
   an upper part of the air cleaner unit protruding into a space defined by a front end of the seat and a concave bottom surface of a rear part of the fuel tank.

8. A motorcycle as defined in claim 7, wherein a casing of the air cleaner unit is substantially prismoid with an upward taper in shape defining an air flow passage extending substantially along a longitudinal axial line thereof.

9. A motorcycle as defined in claim 8, wherein the longitudinal axial line of the casing is slightly inclined in forward direction.

10. A motorcycle as defined in claim 9, wherein the engine is provided with a plurality of laterally arranged cylinders and a plurality of outlet ports of the air cleaner casing are connected to corresponding intake ports of the engine with individual conduits which diverge as they extend toward the engine.

11. A motorcycle, comprising a power unit including an engine having at least one substantially vertically disposed cylinder, a transmission extending rearwardly from a lower portion of said engine, a fuel tank having a front part and a rear part, said fuel tank arranged substantially above said power unit, and a seat arranged behind said fuel tank, said motorcylce further comprising:

an air cleaner unit;

means defining a space for locating said air cleaner unit, said defining means comprising a rear surface of said engine, an upper surface of said transmission and a bottom surface of said fuel tank;

said air cleaner unit having an upper part, said upper-part protruding into a concavity on said bottom surface of said rear part of said fuel tank, said air cleaner unit further including an outlet port connected to an intake port of said engine by way of a passage.

12. A motorcycle as defined in claim 11, wherein said air cleaner unit includes a casing which is substantially prismoidal in shape with an upward taper in shape defining an air flow passage extending substantially along a longitudinal axial line of said air cleaner unit with said passage connecting an outlet port of said air cleaner unit with said intake port of said engine being oriented with a downward slant extending towards the intake port of the engine.

13. A motorcycle as defined in claim 12, wherein said longitudinal axial line of said casing is inclined in a forward direction.

14. A motorcycle as defined in claim 13, wherein said engine comprises a plurality of laterally arranged cylinders and said air cleaner unit casing has a plurality of outlet ports corresponding to a plurality of inlet ports of the engine, said air cleaner unit further including a plurality of passages connecting the corresponding outlet ports of the air cleaner unit casing to the plurality of engine inlet ports, said passages diverging as they extend towards said engine.

15. A motorcycle as defined in claim 14, wherein said air cleaner unit further includes a generally planar air filter element located in said casing substantially perpendicular to the longitudinal axial line of said casing.

16. A motorcycle as defined in claim 15, wherein said casing is provided with an externally projecting bulge for accommodating said air filter element therein.

17. A motorcycle as defined in claim 11, wherein said power unit further includes at least one means for mixing fuel and air, said mixing means located on an upper rear portion of said at least one cylinder, said mixing means having a rear surface and a lower surface, said defining means further includes said rear and lower surfaces of said mixing means, said air cleaner unit further including a casing, said casing having a forward portion extending into the vicinity of said defining means formed by said rear surface of said engine, said upper surface of said transmission and said lower surface of said mixing means.

18. A motorcycle as defined in claim 17, wherein said air cleaner unit further includes a substantially planar air filter located within said casing, at least a portion of said air filter extending into a space defined by said upper surface of said transmission, said rear surface of said engine and said lower surface of said mixing means.

* * * * *